United States Patent

Bamford et al.

Patent Number: 5,870,758
Date of Patent: *Feb. 9, 1999

[54] METHOD AND APPARATUS FOR PROVIDING ISOLATION LEVELS IN A DATABASE SYSTEM

[75] Inventors: Roger J. Bamford, Woodside; Kenneth R. Jacobs, San Mateo, both of Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 613,026

[22] Filed: Mar. 11, 1996

[51] Int. Cl.$^6$ ..................... G06F 17/40
[52] U.S. Cl. ............... 707/201; 707/8; 707/202; 707/203
[58] Field of Search ............ 395/608, 617, 395/618, 619; 707/8, 201, 202, 203

[56] References Cited

U.S. PATENT DOCUMENTS

| | | | |
|---|---|---|---|
| 5,095,421 | 3/1992 | Freund | 395/650 |
| 5,241,675 | 8/1993 | Sheth et al. | 395/600 |
| 5,263,156 | 11/1993 | Bowen et al. | 395/600 |
| 5,287,496 | 2/1994 | Chen et al. | 395/600 |
| 5,333,316 | 7/1994 | Champagne et al. | 395/600 |
| 5,355,477 | 10/1994 | Strickland et al. | 395/600 |
| 5,369,757 | 11/1994 | Spiro et al. | 395/575 |
| 5,388,196 | 2/1995 | Pajak et al. | 395/153 |
| 5,553,279 | 9/1996 | Goldring | 395/600 |
| 5,603,024 | 2/1997 | Goldring | 395/619 |
| 5,613,113 | 3/1997 | Goldring | 395/618 |

*Primary Examiner*—Thomas G. Black
*Assistant Examiner*—Jean R. Homere
*Attorney, Agent, or Firm*—McDermott, Will & Emery

[57] ABSTRACT

A method and system for providing isolation levels in a database system is provided. A serializable isolation level is provided by causing all statements in a transaction to see a "snapshot" of the database. A snapshot includes only those changes made to the database by a particular set of transactions. For example, the snapshot for a given transaction may include only the changes made by transactions that committed prior to the execution of the given transaction. The set of all transactions whose changes are included in a particular snapshot of the database is referred to as the snapshot set. Concurrently executing transactions may update the database while a serializable transaction is being executed. Updates that are not included in the snapshot of the serializable transaction are undone prior to processing each statement in the serializable transaction to recreate the data as it existed in the snapshot. If a serializable transaction attempts to update data that was updated by a transaction that is not in the snapshot set of the serializable transaction, then the serializable transaction is rolled back. A read committed isolation level is provided by establishing a different snapshot for each statement in a transaction.

22 Claims, 5 Drawing Sheets

TRANSACTION TABLE #7                        300

| SLOT | SEQUENCE# | STATUS | SNAPSHOT NUMBER |
|---|---|---|---|
| 0 | 7 | COMMITTED | 50 |
| 1 | 9 | ACTIVE | -- |
| 2 | 5 | COMMITTED | 93 |
| 3 | 8 | COMMITTED | 20 |
| ⋮ | ⋮ | ⋮ | ⋮ |

METHOD AND APPARATUS FOR PROVIDING ISOLATION LEVELS IN A DATABASE SYSTEM

FIELD OF THE INVENTION

The present invention relates to a method and apparatus for accessing stored data, and more specifically, to a method and apparatus for providing isolation levels in a system that allows multiple transactions to have concurrent access to data.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. When multiple users share a database system, it is impractical to allow only one transaction to execute at a time. However, when many transactions are allowed to execute at the same time, it is possible for the transactions to interact in undesirable ways.

To ensure predictable and reproducible results, techniques have been developed which protect concurrently executing transactions from interacting with one another in uncontrolled ways. Transactions are designed to make database changes in such a way that the database, as a whole, moves from one consistent state to another. As long as the database is consistent when the transaction completes, it is acceptable for the database to temporarily become inconsistent from the viewpoint of a single transaction during the execution of the transaction.

Not only must transactions leave the database in a consistent state upon completion, but transactions must also see the database in a consistent state when they begin. This condition is difficult to satisfy because there may be concurrently executing transactions, each of which may be causing a temporary inconsistency visible only within that single transaction. Consequently, transactions must not be able to see the changes made by concurrently executing transactions until those transactions commit (i.e. terminate and make their changes permanent).

To describe fully consistent transaction behavior when transactions execute concurrently, database researchers have defined a transaction isolation level called "serializability". In the serializable isolation level, transactions must execute in such a way that they appear to be executed one at a time ("serially"), rather than concurrently. Serializable mode prevents interactions between transactions that would preclude them from having the effect on the database as if they had executed in some serial order. In other words, concurrent transactions executing in serializable mode are only permitted to make database changes they could have made if the transactions had been scheduled to execute one after another, in some specific order, rather than concurrently. This mode ensures that transactions move the database from one consistent state to another consistent state by preventing potentially harmful interactions between concurrently executing transactions.

While the degree of isolation between transactions provided by serializability mode seems generally desirable, running many transactions in this mode can seriously compromise the transaction processing throughput of a database system. Complete isolation of concurrently running transactions could mean, for example, that one transaction could not do any inserts into a searchable collection of elements (a "table") that was being queried by another transaction. In short, real-world considerations usually make it necessary to provide isolation levels that compromise between perfect transaction isolation and database performance.

The ANSI/ISO SQL standard (SQL92) defines several levels of transaction isolation with differing degrees of impact on transaction processing throughput. These isolation levels are defined in terms of "phenomena" that must be prevented between concurrently executing transactions in order to achieve the required isolation. A greater degree of concurrency and better performance can be achieved using lower levels of transaction isolation, with the tradeoff that concurrent transactions may sometimes interact in specific ways.

SQL92 defines three "phenomena" that concurrently executing transactions may experience and four levels of isolation that provide increasing protection against these "phenomena". The phenomena include:

1) Dirty read: a transaction reads data that has been written by a transaction that has not yet committed.
2) Non-repeatable (or "fuzzy") read: a transaction re-reads data it has previously read, and finds that another committed transaction has modified or deleted it.
3) Phantom read: a transaction searches the database once. It repeats the same exact search and returns a larger set of data elements.

Although it is not explicitly required by SQL92, virtually all database products also preclude "dirty writes". A dirty write occurs when a transaction modifies a data item previously changed by another transaction before the transaction that made the first change commits.

The four levels of isolation in SQL92 are defined in terms of which of these "phenomena" a transaction is permitted to experience, as shown Table 1.

TABLE 1

|  | Dirty Read | Non-Repeatable Read | Phantom Read |
| --- | --- | --- | --- |
| READ UNCOMMITTED | Possible | Possible | Possible |
| READ COMMITTED | Not Possible | Possible | Possible |
| REPEATABLE READ | Not Possible | Not Possible | Possible |
| SERIALIZABLE | Not Possible | Not Possible | Not Possible |

While SQL92 defines the isolation levels that a database system should provide, it does not dictate any particular mechanism for implementing those isolation levels. Many database systems use read and write locks to provide transaction isolation. In systems that use read and write locks to provide transaction isolation, a transaction acquires a read lock on data items it intends to read, and write locks on data items it intends to write. Transactions can also acquire read or write locks, called "predicate locks," on a set of data items defined by a search or query condition.

The locks of two transactions on a given data item conflict if either or both are write locks. When a transaction attempts to acquire a lock that conflicts with one held by another transaction, the second transaction must wait until the conflicting lock is released. Generally, once a transaction acquires a lock, it holds the lock until the end (commit or rollback) of the transaction. By allowing a transaction to release a read lock before the end of the transaction, a system can provide more throughput by reducing contention between readers and writers. However, releasing locks before the end of a transaction exposes the transaction to various forms of inconsistency and possible data corruption.

Read-locking systems provide the various isolation levels defined in SQL92 by precluding the "phenomena" as follows:

Dirty write: only one transaction can hold a write lock on a specific data item. To preclude dirty writes, write locks must be held until a transaction commits. Virtually all database systems always prevent dirty writes, in order to support transaction rollback and prevent totally unpredictable and chaotic results.

Dirty read: a transaction cannot acquire a read lock to read a data item locked for write by another transaction. This rule prevents a query from reading uncommitted data. Relaxing this constraint permits a transaction to see uncommitted data, as READ UNCOMMITTED would allow.

Repeatable read: a transaction cannot acquire a write lock to change a data item read by another active transaction. This rule prevents a transaction from changing data that another transaction has read and may read again. Relaxing this constraint (by releasing a read lock before the reading transaction commits) means that a transaction can see data change between two reads, or see only some of the changes made by a committed transaction. READ COMMITTED isolation allows non-repeatable reads.

Phantom read: a transaction cannot insert new rows that satisfy an existing predicate read lock held by another transaction. Relaxing this constraint means that if a transaction issues the same query twice, it can see additional rows in the second query result. REPEATABLE READ allows phantom reads.

By preventing all the above "phenomena", read-locking systems provide the SQL92 isolation level SERIALIZABLE.

When isolation levels are implemented in the manner described above, read locks block attempts to write, and write locks block attempts to read, even when the blocked action would not create a prohibited interaction. By blocking actions that do not need to be blocked to provide the requisite isolation levels, the throughput of database systems is unnecessarily diminished.

Based on the foregoing, it is clearly desirable to provide a database system that implements the isolation levels specified in SQL92. It is further desirable to implement the isolation levels in a manner that reduces the number of conditions that result in blocked transactions.

SUMMARY OF THE INVENTION

A method and system for providing isolation levels in a database system is provided. According to one aspect of the invention, a serializable isolation level is provided by causing all statements in a transaction to see a snapshot of the database. A "snapshot" of the database includes all of the changes made by a certain set of committed transactions (the "snapshot set"). Transactions that are not part of the snapshot set of a transaction are referred to as "excluded transactions".

An excluded transaction may update the database before a statement in a serializable transaction is executed. Updates made by excluded transactions are undone to recreate the snapshot of the database prior to processing a statement in the serializable transaction. If a serializable transaction attempts to update data that was updated by an excluded transaction, then the serializable transaction is rolled back. A read committed isolation level is provided by establishing a snapshot for each statement in a transaction.

A method for processing a transaction in a computer system is provided. The transaction specifies one or more operations on a database. According to the method, a snapshot is established for the transaction. It is then determined whether an operation specified in the transaction is a read operation.

If the operation is a read operation, then a data container that contains data specified in the read operation is determined. It is then determined if any excluded transactions have modified any data in the data container. If any excluded transactions have modified any data in the data container, then the data container is reconstructed to create a reconstructed data container. The reconstructed data container reflects only data in the snapshot. The read operation is then performed based on data contained in the reconstructed data container.

A computer system including a processor, a computer readable medium, and a memory is also provided. The computer readable medium is coupled to the processor. The computer readable medium stores a database including at least one data container.

The memory stores instructions which cause the processor to perform, on the database, operations specified in a transaction. The operations are performed by causing the processor to perform the steps of establishing a snapshot of the database for the transaction, and processing the transaction based only on data that is contained in the snapshot of the database.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for implementing isolation levels in a database environment is described. In the following description, for the purposes of explanation, numerous specific details, such as the SQL92 isolation levels, are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
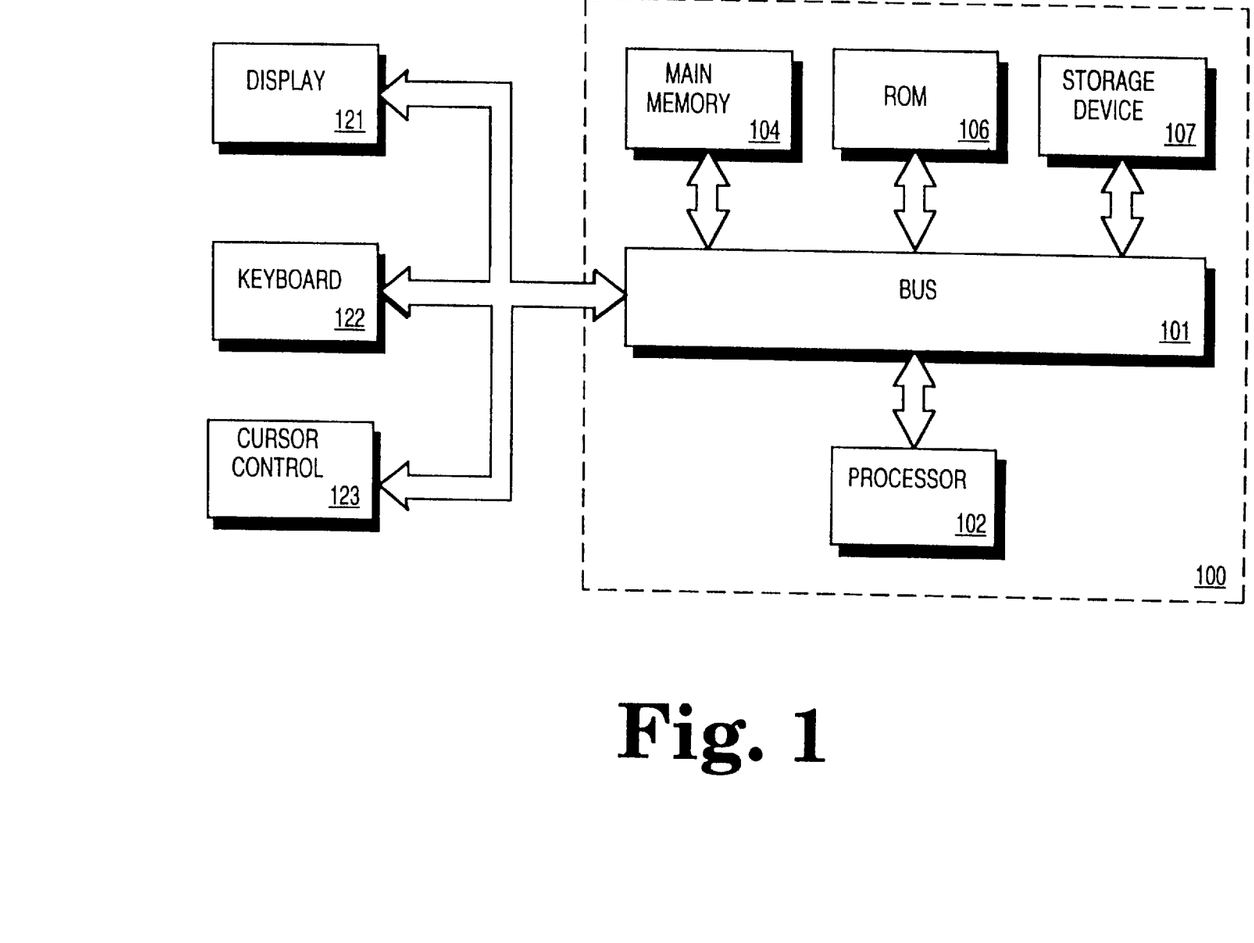
FIG. 1 illustrates a computer system on which the present invention may be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

In the currently preferred embodiment of the invention, computer system 100 is configured to execute a database application that provides various levels of transaction isolation. Computer system 100 may be one of many computer systems accessing data stored in the same database, which may be centralized or distributed. Each of the computer systems may be executing one or more transactions. Undesired interaction between the transactions is prevented by the isolation techniques that shall be described in greater detail below.

Read Consistent Mode

According to an embodiment of the invention, the SQL92 isolation levels READ COMMITTED and SERIALIZABLE are implemented using what shall be referred to hereafter as "Read Consistent Mode". Read Consistent Mode is characterized by two rules. First, every statement executed by a transaction sees only (1) changes that were committed to the database by a particular set of committed transactions (the "snapshot set") and (2) changes made by the transaction itself. This isolates transactions that are issuing reads from the changes made by excluded transactions that are concurrently issuing writes. Second, update transactions lock the rows they write, and hold those locks until the transactions complete. A lock on any given row may be held by only one transaction at a time. A row, as the term is used herein, refers to an exclusive set of one or more associated data elements.

The advantages of Read Consistent Mode over systems that use read locks are due in part to what Read Consistent Mode does not require. Specifically, Read Consistent Mode does not require read locks or predicate locks. Because there are no read locks, reads do not block writes and writes do not block reads. Consequently, the amount of "blocking" that occurs between transactions is reduced, and the overall throughput of the database system increases. Further, because read locks are not used in Read Consistent Mode, the substantial overhead required to maintain read locks is eliminated.

Types Of Read Consistent Mode

There are two general types of Read Consistent Mode: Read Consistent Mode with query-level snapshots and Read Consistent Mode with transaction level snapshots. The difference between the two types of Read Consistent Mode is the manner in which snapshots are established.

In Read Consistent Mode with query-level snapshots, each query within a transaction is processed based on a snapshot, but the snapshot for one query in the transaction may be different than the snapshot for other queries in the transaction. For example, Read Consistent Mode with query level snapshots may be implemented such that the snapshot set for each query includes all transactions that committed prior to the beginning time of the query. Since each query within the transaction will execute at a different time, the snapshot set for one query may not include all of the transactions that are included in the snapshot set for a subsequent query.

In Read Consistent Mode with transaction-level snapshots, all queries in a transaction are processed based on the same snapshot. For example, Read Consistent Mode with transaction-level snapshots may be implemented such that the snapshot set for all queries in a transaction includes all of the transactions that committed prior to the beginning time of the transaction.

Read Committed Isolation

As explained above, READ COMMITTED isolation prohibits the occurrence of "dirty reads". In both types of Read Consistent Mode, all queries see only changes made by the relevant set of committed transactions (i.e. the relevant snapshot set). Consequently, a query will never read "dirty" (uncommitted) data. Thus, both types of Read Consistent Mode provide at least READ COMMITTED isolation.

While "dirty" write protection is not expressly required for READ COMMITTED isolation, both types of Read Consistent Mode also prevent "dirty" writes. Specifically, in Read Consistent Mode only one transaction can hold a write lock on a row, and a transaction that is modifying a row must obtain and hold that lock until transaction completion. This effectively prevents any transaction from modifying a data item previously changed by another transaction before the transaction that made the first change commits.

In the preferred embodiment, write locks are used on data rows and entries in index blocks. Row locks maximize concurrency by minimizing the granularity of data items for which locks are required. Multiple concurrent transactions can modify different rows in the same data containers. In the preferred embodiment, there is no limit on the number of row locks a transaction may acquire, and the lock granularity never escalates beyond individual rows to reduce the number of locks held.

Read Consistent Mode does not prevent other transactions from modifying the data read by a query. Consequently, data that has been read by a query in a transaction may be changed by other transactions before it is read by another query in the same transaction. When query-level snapshots are used, a transaction that includes two queries that read the same data may experience both non-repeatable reads and phantom reads, as defined by SQL92. Because Read Consistent Mode with query-level snapshots prevents dirty reads and writes but does not prevent phantom reads or provide repeatable reads, Read Consistent Mode with query-level snapshots provides READ COMMITTED isolation, but not SERIALIZABLE isolation.

While Read Consistent Mode with query-level snapshots does not provide SERIALIZABLE isolation, it may provide greater consistency than strictly required by the SQL92 isolation level READ COMMITTED. For example, in an implementation in which the snapshot set for each query includes all of the transactions that committed prior to the beginning of the query, a query will always see only data that was committed by transactions that committed prior to the execution of the query. In systems that use read-locking, a single query executed by a READ COMMITTED transaction can see data that was updated and committed after the query started. In such systems even a single query, such as a join, can produce results that are inconsistent with any actual committed state of the database.

Serializable Isolation

To implement SERIALIZABLE isolation, a Read Consistent Mode with transaction-level snapshots is used. In Read Consistent Mode with transaction-level snapshots, all queries within a transaction see a fixed snapshot of the database. For the purpose of explanation, it shall be assumed that the snapshot set for all queries in a transaction includes all of the transactions that have committed at the time at which the transaction begins. However, the specific rule for determining the snapshot set for a transaction may vary from implementation to implementation. For example, one implementation may establish the snapshot set for a transaction to be all transactions that committed prior to the first update to occur after the beginning of the transaction. Further, the snapshot set of a serializable transaction (or statement) may not actually be determined until after the transaction has been processed.

Read Consistent Mode with transaction-level snapshots prevents read/write and write/write conflicts that would cause serializability failures. Specifically, Read Consistent Mode with transaction-level snapshots implements SERIALIZABLE mode by extending the concept of read consistency from the individual query to the entire scope of the transaction. Once a SERIALIZABLE transaction is started, all reads within that transaction will see only data that was committed by the snapshot set. The only new updates that queries within the SERIALIZABLE transaction will see are updates done by the transaction itself. All reads by a SERIALIZABLE transaction are therefore repeatable, as the transaction will access previous versions of data that was changed (or deleted) by excluded transactions. This behavior also results in phantom protection since new rows created by other excluded transactions will be invisible to the SERIALIZABLE transaction.

Snapshots

Both types of Read Consistent Mode require that queries see "snapshots" of the database. Changes made by excluded transactions may be committed to the database before a query of a serializable transaction has completed. When such changes occur, the database no longer reflects the data as it existed in the snapshot. Consequently, the present invention provides a mechanism for determining how the database appeared in the snapshot.

The simplest way to provide snapshots of a database would be to make a copy of the database at a "snapshot time". All transactions that committed prior to the snapshot time would be in the snapshot set. A query that corresponds to a particular snapshot would simply access the copy of the database that was made at the snapshot time, rather than the original version of the database. While this solution is simple, the vast quantity of storage space and computational resources it requires makes it highly inefficient and impractical.

According to one embodiment of the invention, a snapshot mechanism is provided through the use of transaction IDs, snapshot numbers, undo records and transaction tables. In general, transaction IDs are used to uniquely identify transactions. A snapshot number is assigned to a transaction when the transaction commits to indicate to other transactions the transaction set(s) to which the transaction belongs.

Various mechanisms may be used to generate snapshot numbers. For example, the actual system time that a transaction commits may be used as a snapshot number for the transaction. Alternatively, the value stored a counter at the time that a transaction commits may be used as the snapshot number for the transaction, where the counter is incremented for each transaction that commits. The present invention is not limited to any particular mechanism for assigning snapshot numbers, so long as it is possible to determine whether any given transaction belongs to a particular snapshot set by inspecting the snapshot number of the given transaction.

Undo records contain information required to undo ("roll back") changes that have been made to the database. How snapshot numbers and undo records are used to provide snapshots to Read Consistent Mode transactions shall be described in greater detail below with reference to FIGS. 3–5.

Transaction Tables

Figure 3:
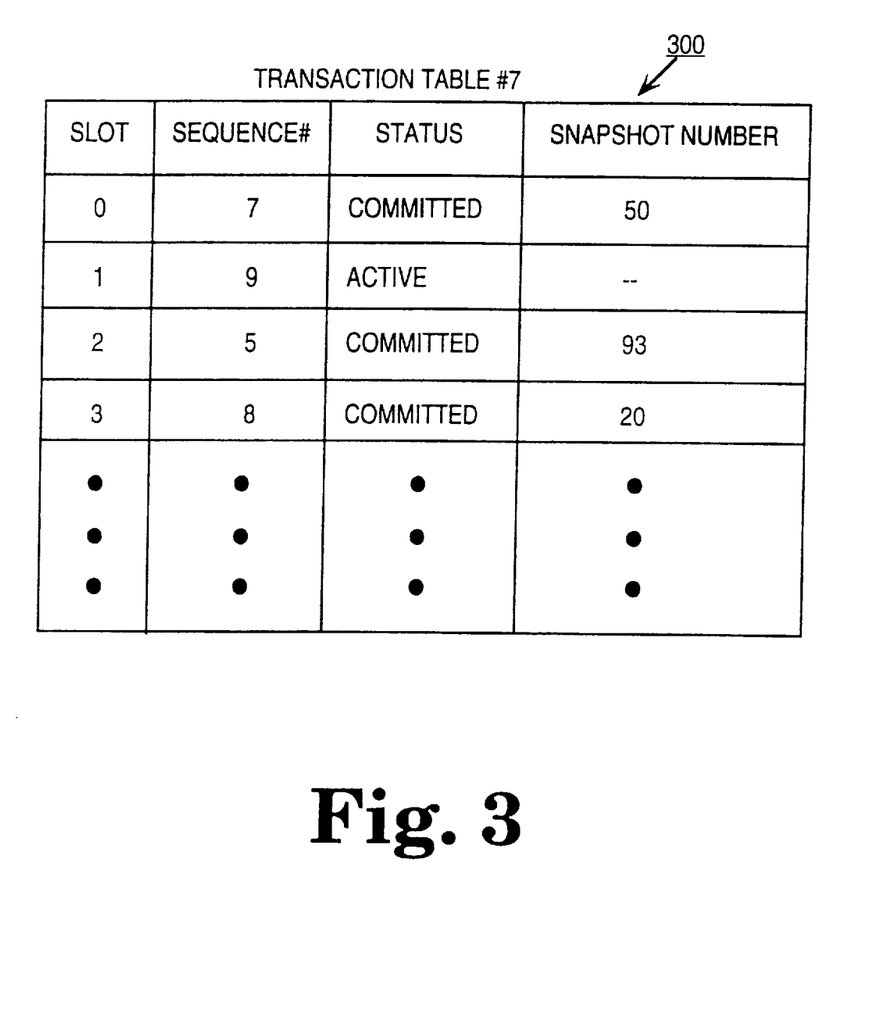
FIG. 3 illustrates a transaction table used to recreate snapshots of a database according to an embodiment of the invention.

FIG. 3 illustrates an exemplary transaction table 300. A transaction table includes a plurality of slots, where each slot can hold an entry that corresponds to a transaction. Each entry contains a sequence number, a status indication and a snapshot number for its corresponding transaction.

The number of entries that a particular transaction table can hold is limited. When a transaction table is full and an entry needs to be added for a new transaction, the entry that corresponds to the oldest transaction is overwritten with the new entry. To distinguish between transactions that have used the same slot, the sequence number for a slot is changed every time the slot is reused. For example, every time a slot is reused, the sequence number may be incremented.

To uniquely identify transactions, transaction IDs are generated from the information contained in the transaction table entries that correspond to the transactions. In one embodiment, the transaction ID of a transaction consists of the number of the transaction table that contains the entry for the transaction, the slot number that holds the entry, and the sequence number of the transaction.

When the transaction ID of a transaction is known, other transactions may easily determine the snapshot number of the transaction. To determine the snapshot number of a transaction, the entry that is located in the slot (identified in the transaction ID) of the transaction table that is identified in the transaction ID is inspected. If the sequence number in that entry matches the sequence number identified in the transaction ID, then the entry corresponds to the transaction in question. Therefore, the snapshot number stored in the entry is the snapshot number for the transaction in question.

If the sequence number stored in the entry is higher than the sequence number indicated in the transaction ID, then the snapshot number of the transaction cannot be determined from the information in the transaction table because the entry for the transaction in question has be overwritten. However, in systems that always overwrite the oldest entry, it is known that the transaction in question committed before the oldest transaction currently stored in the transaction table.

According to one embodiment of the invention, an undo log is kept for transaction tables. The undo log for a transaction table contains records of old entries that have been overwritten in the transaction table. For example, a typical record in the undo log of a transaction table will contain the slot number in which an entry had resided, and the sequence number and snapshot number of the entry. Therefore, even when the entry for a transaction has been overwritten, the snapshot number of the transaction may be determined by inspecting the undo log of the transaction table in which the entry for the transaction had originally resided.

Data Containers

Figure 4:
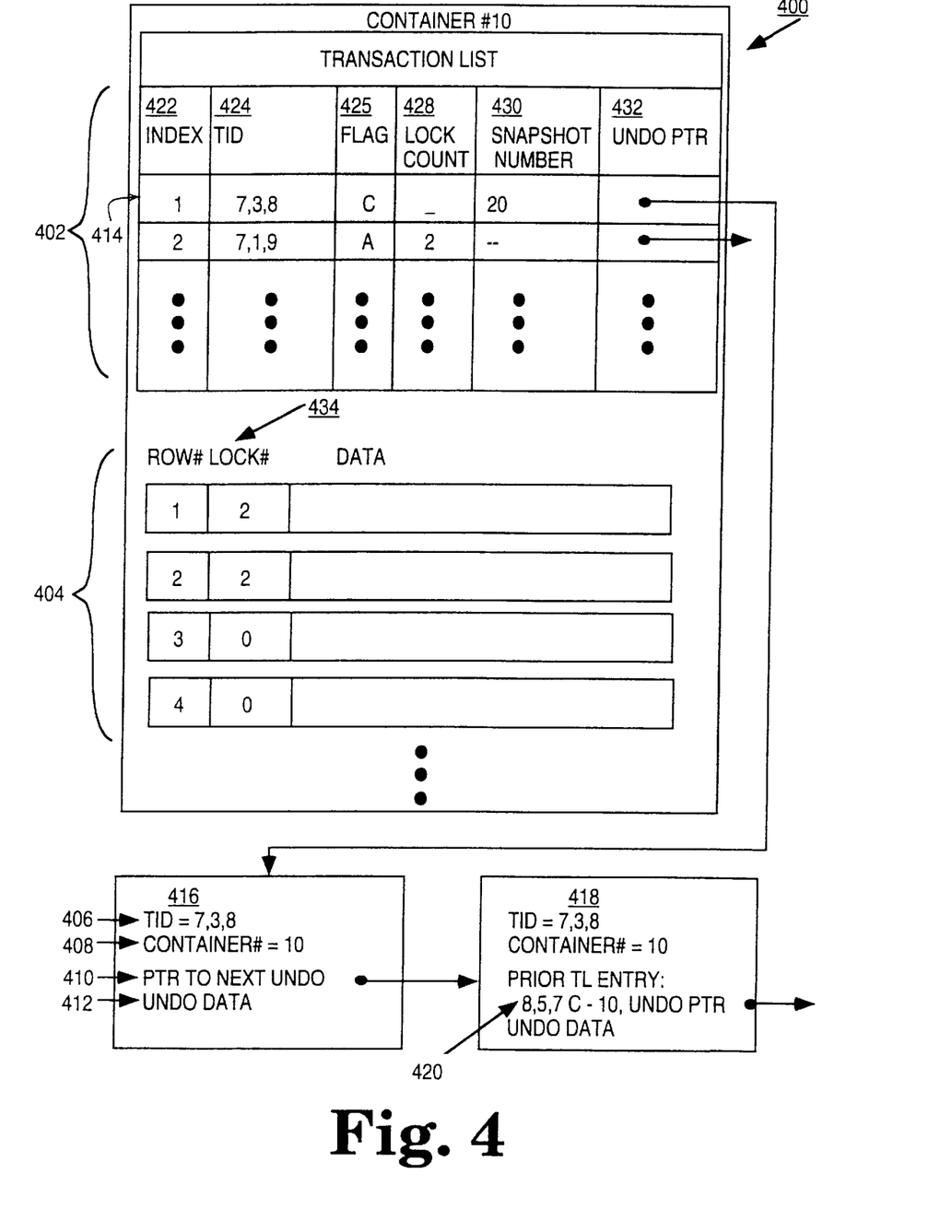
FIG. 4 illustrates a data container and undo records of a database according to an embodiment of the invention.

When data in the database is changed in response to the execution of a transaction, the transaction ID of the transaction is stored with the data to identify the transaction that made the changes. Referring to FIG. 4, it illustrates an exemplary data container 400 of a database. The data container 400 includes a transaction list section 402 and a data section 404. The transaction list section 402 includes entries that correspond to transactions that have modified data container 400. Each entry includes an index number 422, a transaction ID 424, a status flag 426, a lock count 428, a snapshot number 430 and an undo pointer 432.

The status flag 426 indicates whether the transaction that corresponds to the entry is active or has committed. The lock count 428 indicates how many rows within the block are write locked by the transaction. The undo pointer 432 points to an undo record that indicates how to undo the most recent change made to the block by the transaction that corresponds to the entry.

The data section of the block includes rows of data. A portion of each row is used as a write lock indicator 434 to indicate whether the row is currently write locked. In the preferred embodiment, the write lock indicator 434 contains the index in the transaction list of the transaction that holds the lock on the row in question.

Undo Records

FIG. 4 also illustrates the contents of an undo record according to an embodiment of the invention. The undo record includes a transaction ID 406, a block number 408, a prior change pointer 410, and undo information 412. The transaction ID 406 identifies the transaction which performed the operation that corresponds to the undo record. The block number 408 indicates the data container on which the operation was performed. The undo information 412 contains data necessary for undoing the operation that was performed on the identified block by the identified transaction.

The undo pointer 410 points to an undo record 418 for undoing a previous change to the same block by the same transaction. Each change made to the block by a transaction is linked in this manner to form linked list of undo records. The undo pointer in the transaction list section 402 points to the end of the linked list that represents the most recent change to the block made by the transaction. At the other end of the linked list is the undo record that corresponds to the first change made to the block by the transaction.

The undo record that corresponds to the first change made to the block by a particular transaction does not contain a pointer to an undo record for an earlier change to the block by the same transaction, since there can be no change earlier than the first change. Rather, the undo record that corresponds to the first change made by a transaction to a block contains the entry that was overwritten in the transaction list of the block by the entry for the transaction at issue.

In the illustrated example, the entry 414 corresponds to the transaction identified by the transaction ID "7,3,8". The undo pointer in entry 414 points to the undo record 416 that corresponds to last change made to data container 400 by transaction "7,3,8". The undo pointer of undo record 416 points to the undo record 418 that corresponds to the first change made to data container 400 by transaction "7,3,8". Thus, transaction "7,3,8" made two updates to the data in data container 400. The undo record 418 contains a record 420 of the entry that was overwritten by entry 414.

Operation of Read Consistent Mode using Snapshot Mechanism

Figure 5:
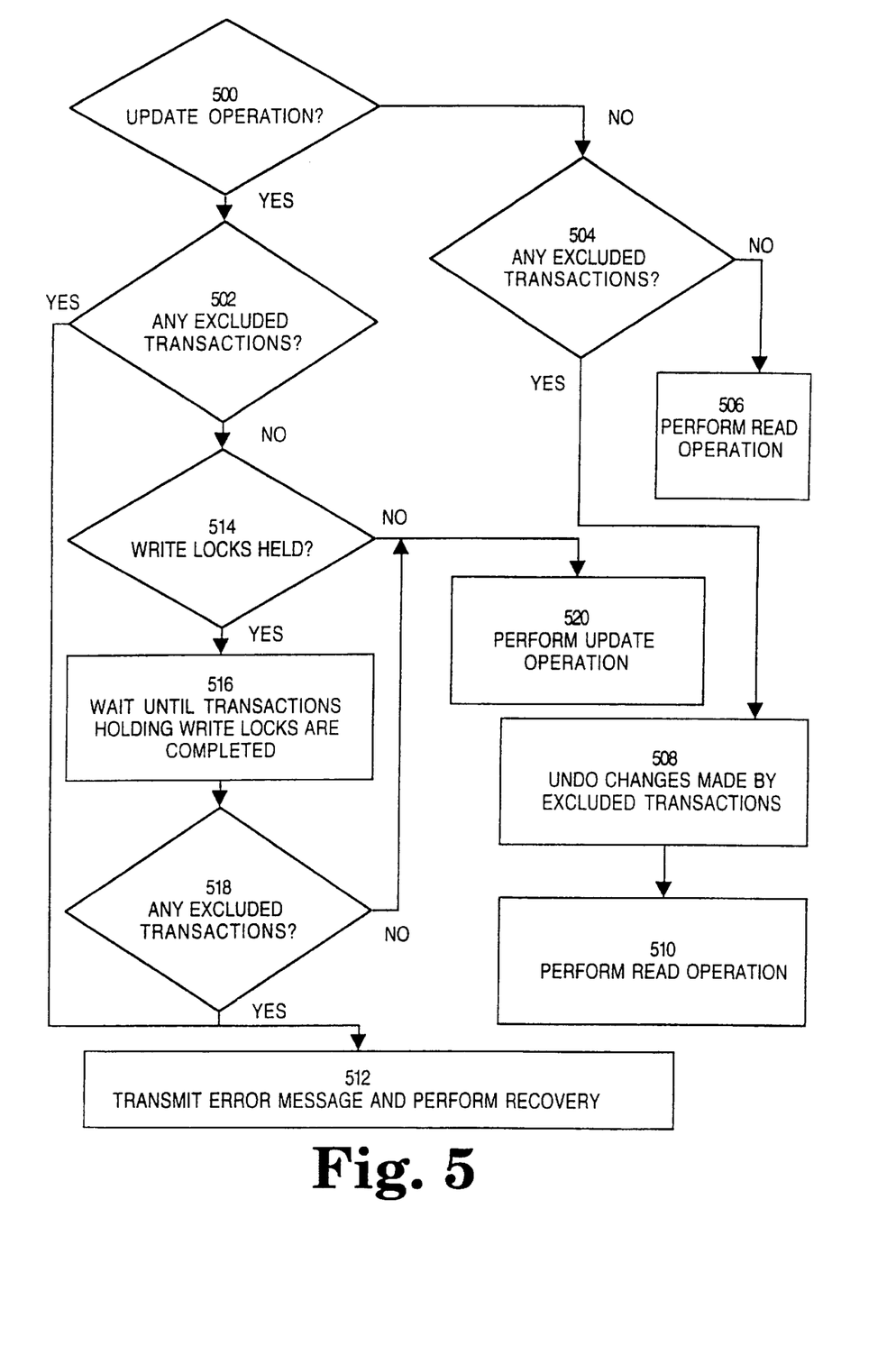
FIG. 5 is a flow chart illustrating the operation of a database application according to an embodiment of the invention.

FIG. 5 is a flow chart that illustrates how the snapshot mechanism described above is used to provide Read Consistent Mode. For the purposes of explanation, it shall be assumed that each transaction that commits is assigned a snapshot number from a counter that is incremented every time that a transaction commits. It shall also be assumed that the counter was at 15 when the Read Consistent Mode transaction that shall be discussed in the present example began to be executed. Finally, it shall be assumed that snapshot set of the Read Consistent Mode transaction includes all transactions that were committed as of the time that the Read Consistent Mode transaction began execution. Under these conditions, a committed transaction belongs to the snapshot set of the Read Consistent Mode transaction if and only if the snapshot number that was assigned the committed transaction is equal to or less than 15.

At step 500, it is determined whether the operation specified by the Read Consistent Mode transaction updates a data container. If the operation specifies an update operation, then control proceeds to step 502. If the operation specifies a read operation, then control proceeds to step 504.

At step 504, it is determined whether any of the entries in the transaction list represent transactions that do not belong to the snapshot set of the Read Consistent Mode transaction (i.e. whether any of the entries in the transaction list represent excluded transactions). In the present example, any transaction that has a snapshot number greater than 15 is an excluded transaction. Therefore, step 504 may easily be performed by comparing the value 15 to the snapshot number of the entries in the transaction list of the block.

If none of the entries in the transaction list represent excluded transactions, then control passes to step 506. At step 506, the read operation specified in the Read Consistent Mode transaction is performed on the data currently contained in the specified data container.

If any of the entries in the transaction list represent excluded transactions, then control passes to step 508, where the changes made by the excluded transactions are undone. Specifically, at step 508, the database application that is processing the Read Consistent Mode transaction recreates the data that existed prior to the changes made by the excluded transactions based on the information contained in the undo records pointed to by the undo pointers in the entries for the transactions.

For example, transaction "7,3,8" was assigned the snapshot number 20, as indicated in entry 414. Because 20 is greater then 15, transaction "7,3,8" does not belong to the transaction set of the Read Consistent Mode transaction. Thus, before the Read Consistent Mode transaction can read data from data container 400, the changes made to data container 400 by transaction "7,3,8" must be undone. These changes are undone based on the information contained in undo records 416 and 418. By this same process, the changes made to data container 400 by all transactions that have snapshot numbers greater than 15 are undone. Once the appropriate changes have been undone, the read operation is performed (step 510).

If the statement in the Read Consistent Mode transaction specifies an update operation, then control passes from step 500 to step 502. At step 502, it is determined whether any of the entries in the transaction list represent excluded transactions. If any of the entries in the transaction list represent excluded transactions, then control passes to step 512. If none of the entries in the transaction list represent excluded transactions, then control passes to step 514.

At step 512, the Read Consistent Mode transaction fails and appropriate recovery steps are performed. Recovery steps may include, for example, rolling back the Read Consistent Mode transaction. Recovery steps shall be described in greater detail below.

If none of the entries in the transaction list represents excluded transactions, then it is determined whether any of the changes specified by the Read Consistent Mode transaction are to be performed on rows that are currently write locked by another transaction (step 514). If no rows are write locked, the changes specified by Read Consistent Mode transaction are performed (step 520).

If any row to be updated is write locked, then the Read Consistent Mode transaction waits until the transactions that own the locks either roll back or commit (step 516). When the transactions that hold the write locks complete, it is determined whether the transactions committed or rolled back (step 518). If any of the transactions committed, then the Read Consistent Mode transaction fails and appropriate recovery steps are performed (step 512). If the transactions rolled back and the locks are released, then the Read Consistent Mode transaction makes the changes to the specified rows (step 520).

Both READ COMMITTED and SERIALIZABLE transactions wait if they attempt to change a row updated by an excluded transaction. The second transaction that attempts to update a given row waits for the other transaction to commit or rollback and release its lock. If that other transaction rolls back, the waiting transaction (regardless of its isolation mode) can proceed to change the previously locked row, as if the other transaction had not existed.

However, READ COMMITTED and SERIALIZABLE transactions behave differently if the other (blocking) transaction commits. When the other transaction commits and releases its locks, a READ COMMITTED transaction will proceed with its intended update. A SERIALIZABLE transaction, however, will fail with the error "Can't serialize access", since the other transaction has committed a change that does not belong to the snapshot of the SERIALIZABLE transaction.

In the embodiment described above, a Read Consistent Mode with transaction level snapshots rolls back when the transaction attempts to update any row in a block that contains data that is not in the relevant snapshot. In an alternative embodiment, rollback is only performed if any of the specific rows that are to be updated are not in the relevant snapshot. To determine whether a particular row has been changed, the undo information is used to reconstruct the data container as it existed in the snapshot. The rows in the reconstructed data container are compared to the rows in the current data container. Any rows that are the same may be updated by the SERIALIZABLE transaction without causing a serializability error.

Optimistic Concurrency Control

The Read Consistent Mode implementation of SERIALIZABLE transaction isolation can be characterized as an "optimistic" concurrency control scheme. Typical schemes that employ read locks are "pessimistic" in that they assume that the SERIALIZABLE transaction will attempt to modify the same rows that another transaction may change at about the same time. Based on this assumption, pessimistic systems provide a transaction with a consistent set of data to read and write by preventing a concurrent transaction from modifying data read by the transaction.

In contrast, Read Consistent Mode makes the "optimistic" assumption that the SERIALIZABLE transaction will not attempt to modify the same rows that another transaction may change at about the same time. Read Consistent Mode therefore gives the SERIALIZABLE transaction a consistent view (snapshot) of data to both read and write. When the underlying "optimistic" expectation is not met, at least the statement (and perhaps the transaction) must roll back, wasting some work. However, in the preferred embodiment row level write locks are used to reduce the chance that two transactions will interact. This "optimistic" assumption made by Read Consistent Mode SERIALIZABLE mode is appropriate in many environments.

Recovery Operations

As illustrated above, to ensure serializable execution, a SERIALIZABLE transaction cannot modify rows changed by excluded transactions. Such transactions are "too recent" to have their changes included in the snapshot of the SERIALIZABLE transaction. In a SERIALIZABLE transaction, an UPDATE or DELETE statement attempting to make such a modification will fail and cause an error message to be generated.

When a SERIALIZABLE transaction fails with this error, the application that is processing the SERIALIZABLE transaction may take any of several actions: (1) commit the work executed to that point, (2) execute additional (but different) statements (perhaps after rolling back to a savepoint established earlier in the transaction), or (3) rollback the entire transaction.

Repeated attempts to execute the same statement without committing or rolling back will always fail, since repeatedly executing a statement will not change the snapshot that applies to the transaction or the fact that the data that the statement is attempting to update has been changed by a transaction that is not included in the snapshot set.

Exemplary Serializable Transaction

Figure 2:
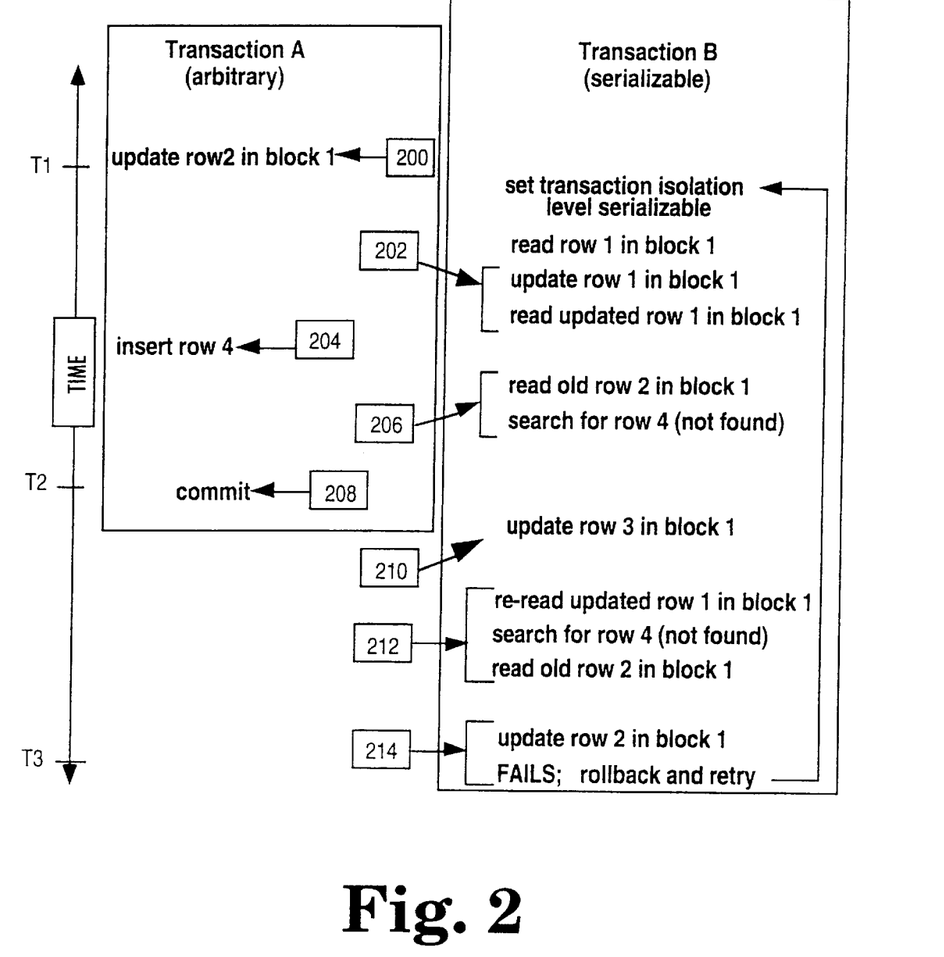
FIG. 2 illustrates interaction between an arbitrary transaction and a SERIALIZABLE transaction according to an embodiment of the invention.

FIG. 2 illustrates the behavior of a SERIALIZABLE transaction executing at the same time as another arbitrary excluded transaction. The isolation level of the arbitrary transaction is irrelevant to the processing of the SERIALIZABLE transaction. In the illustrated embodiment, whenever a SERIALIZABLE transaction attempts to modify a row containing a change made by an excluded transaction, the SERIALIZABLE transaction is rolled back at least as far as the statement which sets the transaction to SERIALIZABLE.

FIG. 2 illustrates repeatable read, phantom protection and concurrent access as experienced by a SERIALIZABLE transaction implemented using Read Consistent Mode with transaction-level snapshots. Referring to FIG. 2, transactions begin implicitly when the first executable statement of the transaction begins to be processed. Thus, the SERIALIZABLE transaction (Transaction B) begins at time T1. It shall be assumed that the snapshot set of Transaction B includes all of the transactions that committed prior to time T1.

All changes made to the database by Transaction A are committed to the database at time T2, the commit time of Transaction A. Because the changes made by Transaction A are committed after time T1, none of the changes made by Transaction A are visible to Transaction B. This is true regardless of whether the statements in Transaction A that specified the changes were processed before or after time T1.

At step 202, Transaction A updates row2 in block1. As mentioned above, the changes made by this update are not committed until time T2. Because time T2 is after the snapshot time T1 of Transaction B, these changes will not be visible to Transaction B.

At step 202 the SERIALIZABLE transaction makes an update to row1 in block1, then reads row1 of block1. During the read operation, Transaction B sees its own update, but does not see the update made by the "too-recent" arbitrary transaction. The SERIALIZABLE transaction does not get an error even though it modifies a row in a block that contains a row that was changed by Transaction A since the start of the SERIALIZABLE transaction.

At step 204, Transaction A inserts a row4. At step 206, Transaction B reads row2 in block1 and searches for row4. The row2 that is read by Transaction B is the row2 that existed prior to the update performed at step 200 (undo operations are not necessary because the update made at step 200 has not yet been committed). During the search for row4, the SERIALIZABLE Transaction B does not see an additional ("phantom") row in the second query for row4.

At step 208, Transaction A commits, causing a snapshot number to be assigned to Transaction A. At step 210, Transaction B modifies row3 in block1. At step 212, Transaction B re-reads updated row1 in block1, searches for row4, and reads old row2 in block1. In the search for row4, row4 is not found even though the row was inserted and committed by another transaction prior to the search because the changes made by Transaction A are undone before Transaction B reads block1.

At step 214 the SERIALIZABLE Transaction B fails when it attempts to update a row changed and committed by a transaction that is not in the snapshot set of the SERIALIZABLE transaction. As is apparent, the execution of a SERIALIZABLE transaction does not, in general, affect concurrent updates executed by another transaction.

Since the Transaction B described above is not exposed to non-repeatable reads nor to phantoms, it is "serializable". In other words, it could have been executed entirely before the arbitrary transaction with the same effect on the database. Read Consistent Mode has provided this transaction with "ISOLATION LEVEL SERIALIZABLE" as defined in SQL92.

Insufficient History

Under some circumstances, a database application may have insufficient history information to determine whether a row has been updated by an excluded transaction. This can occur when many transactions modify the same data container in a very short period of time. In this case, Read Consistent Mode assumes that a row has been updated by a excluded transaction and initiates appropriate recovery procedures.

In an update intensive environment, frequent serializability errors will result if many data containers have insufficient space to record the activity of recent transactions. In the preferred embodiment, this problem is mitigated by allowing users to increase the space for history in the data container (e.g. the size of the transaction list and the number of undo levels for the transaction list). Experiments have shown that just a few additional bytes of storage per block for update histories can significantly reduce the incidence of serializability failures. If a particular set of data is causing the problem, this problem can also be addressed by spreading the "contentious" data over more blocks.

Comparison of Types of Read Consistent Mode

Read Consistent Mode gives the application developer a choice of two transaction isolation levels with different characteristics. Both the READ COMMITTED and SERIALIZABLE isolation levels provide a high degree of consistency and concurrency. Both levels provide the contention-reducing benefits of Read Consistent Mode's "read consistency" multi-version concurrency control model and exclusive row-level locking implementation. Table 2 summarizes key similarities and differences between READ COMMITTED and SERIALIZABLE transactions as implemented in Read Consistent Mode.

TABLE 2

| PHENOMENON | READ COMMITTED | SERIALIZABLE |
| --- | --- | --- |
| Dirty write | Not possible | Not possible |
| Dirty read | Not possible | Not possible |
| Non-repeatable read | Possible | Not possible |
| Phantoms | Possible | Not possible |
| Compliant with ANSI/ISO SQL92 | Yes | Yes |
| Read snapshot level | Statement | Transaction |
| Transaction set consistency | Statement level | Transaction level |
| Row-level locking | Yes | Yes |
| Readers block writers | No | No |
| Writers block readers | No | No |

TABLE 2-continued

| PHENOMENON | READ COMMITTED | SERIALIZABLE |
|---|---|---|
| Different-row writers block writers | No | No |
| Same-row writers block writers | Yes | Yes |
| Waits for blocking transaction | Yes | Yes |
| Subject to "can't serialize access" | No | Yes |
| Error after blocking transaction aborts | No | No |
| Error after blocking transaction commits | No | Yes |

Both Read Consistent Mode isolation modes provide high levels of consistency and concurrency and performance through the combination of row-level locking and Read Consistent Mode's multi-version concurrency control system. Because readers and writers do not block one another in Read Consistent Mode, while queries still see consistent data, both READ COMMITTED and SERIALIZABLE isolation provide a high level of concurrency for high performance, without the need for reading uncommitted ("dirty") data.

READ COMMITTED isolation can provide considerably more concurrency with a somewhat increased risk of inconsistent results (due to phantoms and non-repeatable reads) for some transactions. The SERIALIZABLE isolation level provides somewhat more consistency by protecting against phantoms and non-repeatable reads, and may be important where a read/write transaction executes a query more than once.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for isolating a first transaction that modifies a database from changes made to the database by other concurrently executing transactions, the method comprising the computer-implemented steps of:

establishing a non-current snapshot of the database for a statement in said first transaction, said non-current snapshot only including changes made to said database by a particular set of transactions; and processing said statement based only on data that is contained in the non-current snapshot.

2. The method of claim 1 wherein said first transaction includes a plurality of statements, the method further comprising the steps of:

establishing said non-current snapshot as the snapshot for all of said plurality of statements; and processing each of said plurality of statements based only on data that is included in said non-current snapshot.

3. The method of claim 1 wherein said first transaction includes a plurality of statements, the method further comprising the steps of:

establishing a separate snapshot for each of said plurality of statements; and processing each statement of said plurality of statements based only on data included in the snapshot established for said statement.

4. The method of claim 2 wherein said step of establishing said non-current snapshot as the snapshot for all of said plurality of statements comprises the step of establishing as said particular set of transactions all transactions that committed prior to execution of said first transaction.

5. The method of claim 3 wherein said step of establishing a separate snapshot for each of said plurality of statements comprises the step of including in the snapshot for each statement all changes made to the database by transactions that committed prior to execution of said statement.

6. The method of claim 1 further comprising the steps of:

determining whether said statement specifies a change to a portion of said database;

if said statement specifies a change to a portion of said database, then performing the steps of establishing a write lock on said portion of said database;

changing said portion of said database in response to said statement after establishing said write lock on said portion of said database;

preventing said portion of said database from being changed in response to transactions other than said first transaction while said write lock is maintained on said portion of said database; and releasing said write lock on said portion of said database upon completion of said first transaction.

7. The method of claim 6 wherein:

said step of determining whether said statement specifies a change to a portion of said database is performed by determining whether said statement specifies a change to a group of one or more elements in a table of said database;

said step of establishing a write lock on said portion of said database is performed by establishing a write lock on said group of one or more elements; and said step of preventing said portion of said database from being changed in response to transactions other than said first transaction while said write lock is maintained on said portion of said database is performed by preventing said group of one or more elements from being changed in response to transactions other than said first transaction while said write lock is maintained on said group of one or more elements.

8. The method of claim 1 wherein said step of processing said statement based only on data that is included in said non-current snapshot comprises the step of:

determining a snapshot number for each of a plurality of transactions that modified a data container that contains data specified in said statement; and performing operations which undo changes to said data container made by each of said plurality of transactions that has a snapshot number that has a predetermined comparative relationship to a predetermined number.

9. The method of claim 8 wherein said step of determining a snapshot number for each of said plurality of transactions that modified said data container includes performing the following steps for each transaction of said plurality of transactions:

identifying a transaction table that contains an entry for said transaction based on information stored in said data container; and reading a snapshot number for said transaction from said transaction table.

10. The method of claim 8 wherein said step of performing operations which undo changes to said data container includes performing the following steps for each of said plurality of transactions that has a snapshot number with said predetermined comparative relationship relative to said predetermined number:

using an undo pointer stored with said data container to identify an undo record corresponding to a change made by said transaction to said data container; and performing undo operations based on undo data stored in said undo record.

11. The method of claim 10 wherein said step of performing operations which undo changes to said data container also includes performing the following steps for at least one of said plurality of transactions that has a snapshot number with said predetermined comparative relationship relative to said predetermined number:

a) using an undo pointer stored in said undo record to identify a next undo record that corresponds to another change made by said transaction to said data container;

b) performing undo operations based on undo data stored in said next undo record;

c) repeatedly performing steps a) and b) until all changes made by said transaction to said data container are undone.

12. A computer system comprising:

a processor;

a computer readable medium coupled to said processor, said computer readable medium storing a database including a data container;

a memory that has stored therein instructions which cause said processor to perform, on said database, operations specified in a transaction that modifies said database by causing said processor to perform the steps of:

establishing a non-current snapshot for said transaction, said non-current snapshot including all changes committed to said database by a particular set of transactions; and processing said transaction based only on data that included in said non-current snapshot.

13. The computer system of claim 12 wherein said data container includes a transaction list that contains data that identifies transactions that have modified said data container, wherein said instructions cause said processor to perform the steps of:

determining a snapshot number for each of the transactions identified in said transaction list; and undoing changes made by transactions identified in said transaction list that have snapshot numbers that have a predetermined comparative relationship to a predetermined number.

14. The computer system of claim 12 wherein said computer readable medium includes a transaction table, said transaction table including a plurality of entries, each entry of said plurality of entries corresponding to one of a plurality of transactions, each entry that corresponds to a transaction that has committed including a snapshot number that indicates when said transaction committed.

15. A method for processing a transaction in a computer system, the transaction specifying one or more operations on a database, said one or more operations including at least one operation that modifies said database, the method comprising the steps of:

establishing a snapshot for the transaction, said snapshot including all changes committed to said database by a particular set of transactions;

determining whether an operation specified in said transaction is a read operation;

if said operation is a read operation, then performing the steps of:

determining a data container that contains data specified in said read operation;

determining if any transactions that do not belong to the particular set modified any data in said data container;

if any transactions that do not belong to the particular set modified any data in said data container, then reconstructing said data container to create a reconstructed data container, said reconstructed data container reflecting only changes made by said particular set of transactions; and performing said read operation based on data contained in said reconstructed data container.

16. The method of claim 15 further comprising the steps of:

if said operation is an update operation, then performing the steps of determining a data container that contains data specified in said update operation;

determining if any transactions that do not belong to the particular set modified any data in said data container; and if any transactions that do not belong to the particular set modified any data in said data container, then rolling back said transaction.

17. The method of claim 15 further comprising the steps of:

if said operation is an update operation, then performing the steps of determining a data container that contains data specified in said update operation;

determining if any transactions that do not belong to the particular set modified any data in said data container;

if any transactions that do not belong to the particular set modified any data in said data container, then reconstructing said data container to create a reconstructed data container, said reconstructed data container reflecting only changes made by said particular set of transactions; and comparing said data container to said reconstructed data container to determine which groups of one or more elements in said data container contain changes committed by transactions that do not belong to said particular set;

if any groups of one or more elements that would be modified by said update operation contain changes committed by transactions that do not belong to said particular set, then rolling back said transaction; and if no groups of one or more elements that would be modified by said update operation contain changes committed by transactions that do not belong to said particular set, then performing said update operation.

18. The method of claim 15 wherein said step of determining if any transactions that do not belong to the particular set modified any data in said data container includes the steps of:

storing in said data container information that identifies transactions that modify data in said data container;

reading from said data container said information that identifies transactions; and determining a snapshot number for each of the transactions identified in said information.

19. The method of claim 18 wherein the step of determining a snapshot number for each of the transactions identified in said information comprises the steps of:

for each transactions that operates on said database, performing the steps of
storing an entry that corresponds to said transaction in a transaction table;
when said transaction commits, storing a snapshot number in said entry;

for each of the transactions identified in said information, performing the steps of identifying the entry in the transaction table that corresponds to said transaction; and reading said snapshot number from said entry.

20. The method of claim 19 wherein the step of identifying the entry in the transaction table that corresponds to said transaction is performed based on information contained in said data container.

21. The method of claim 1 wherein said statement reads a data item from said database, and wherein the step of processing said statement includes processing said statement based on a version of said data item that does not contain one or more committed changes that have been made to the data item.

22. The method of claim 1 wherein the statement requires modification to a data item, and the step of processing said statement includes rolling back said first transaction if said data item has any committed changes that do not belong to said snapshot.

* * * * *